(12) United States Patent
Liu et al.

(10) Patent No.: US 10,399,305 B2
(45) Date of Patent: Sep. 3, 2019

(54) COVER GLASS LAMINATION STRUCTURE

(71) Applicant: NANCHANG O-FILM OPTICAL TECHNOLOGY CO., LTD, Nanchang (CN)

(72) Inventors: Wei Liu, Nanchang (CN); Genchu Tang, Nanchang (CN); Bin Tang, Nanchang (CN)

(73) Assignee: NANCHANG O-FILM OPTICAL TECHNOLOGY CO., LTD, Nanchang (CN)

(*) Notice: Subject to any disclaimer, the term of this patent is extended or adjusted under 35 U.S.C. 154(b) by 301 days.

(21) Appl. No.: 15/600,601

(22) Filed: May 19, 2017

(65) Prior Publication Data
US 2018/0117882 A1  May 3, 2018

(30) Foreign Application Priority Data

Oct. 31, 2016  (CN) ............ 2016 1 0934507

(51) Int. Cl.
*B32B 15/04* (2006.01)
*B32B 17/06* (2006.01)
*B32B 17/10* (2006.01)

(52) U.S. Cl.
CPC .. *B32B 17/10678* (2013.01); *B32B 17/10045* (2013.01); *B32B 17/10128* (2013.01); *B32B 17/10165* (2013.01); *B32B 2457/208* (2013.01)

(58) Field of Classification Search
USPC ........................... 428/426, 428, 432
See application file for complete search history.

(56) References Cited

U.S. PATENT DOCUMENTS

| | | | |
|---|---|---|---|
| 2016/0016845 A1* | 1/2016 | Cho | C03C 15/00 428/157 |
| 2017/0150626 A1* | 5/2017 | Kim | G02F 1/133308 |
| 2018/0117880 A1* | 5/2018 | Liu | B32B 17/06 |
| 2018/0118605 A1* | 5/2018 | Liu | G02B 1/18 |
| 2019/0041568 A1* | 2/2019 | Li | G02B 6/0036 |

FOREIGN PATENT DOCUMENTS

| | | | |
|---|---|---|---|
| TK | WO2016043572 | * | 3/2016 |
| WO | WO2018105857 | * | 6/2018 |

OTHER PUBLICATIONS

WO2018105857 translation, 2018 (Year: 2018).*
WO2016043572 translation, 2016 (Year: 2016).*

* cited by examiner

*Primary Examiner* — Lauren R Colgan
(74) *Attorney, Agent, or Firm* — Franklin & Associates International Inc; Matthew F. Lambrinos

(57) ABSTRACT

A cover glass lamination structure includes: a glass substrate having opposed first and second surfaces, wherein the glass substrate has a visible region in a middle portion thereof and a peripheral region located at a peripheral of the visible region; an ultraviolet (UV) textured layer disposed on the first surface and within the peripheral region, wherein the UV textured layer comprises a plurality of protrusions, the protrusion has a height of about 5 μm to about 200 μm, and a width of about 20 μm to about 200 μm; and a coating layer disposed on the UV textured layer.

13 Claims, 5 Drawing Sheets

COVER GLASS LAMINATION STRUCTURE

RELATED APPLICATIONS

This application claims priority under 35 U.S.C. § 119 to Chinese Patent Application No. 201610934507.3, filed on Oct. 31, 2016. The entire content of which is incorporated herein in its entirety.

FIELD OF THE INVENTION

The present disclosure relates to touch devices, and more particularly relates to a cover glass lamination structure which can be applied to a touch device.

BACKGROUND OF THE INVENTION

Cover glass is widely used in electronic devices having a touch function. Usually, the cover glass is provided with a plurality of decorative layers, so as to meet specific appearance requirements of the cover glass. For example, the cover glass can be divided into a transparent visible region and a nontransparent peripheral region. Normally, an ultraviolet (UV) textured layer is formed on the cover glass, and other decorative layers are then disposed on the UV textured layer, such that they can be attached to the glass cover. The decorative layers may exhibit different visual effects by the pattern possessed by the UV textured layer. However, it is not described in the prior art that how to configure the UV textured layer to make the visual effect of the cover glass become more significant, or how to make the processing of the UV textured layer more convenient.

SUMMARY OF THE INVENTION

The present disclosure is directed to a cover glass lamination structure.

A cover glass lamination structure includes: a glass substrate having opposed first and second surfaces, wherein the glass substrate has a visible region in a middle portion thereof and a peripheral region located at a peripheral of the visible region; an ultraviolet (UV) textured layer disposed on the first surface and within the peripheral region, wherein the UV textured layer comprises a plurality of protrusions, the protrusion has a height of about 5 µm to about 200 µm, and a width of about 20 µm to about 200 µm; and a coating layer disposed on the UV textured layer.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout the views.

DETAILED DESCRIPTION OF THE EMBODIMENTS

Reference will now be made to the drawings to describe, in detail, embodiments of the present cover glass lamination structure. It should be noted that references to "an" or "one" embodiment in this disclosure are not necessarily to the same embodiment, and such references mean at least one.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein,""above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list.

Figure 1:
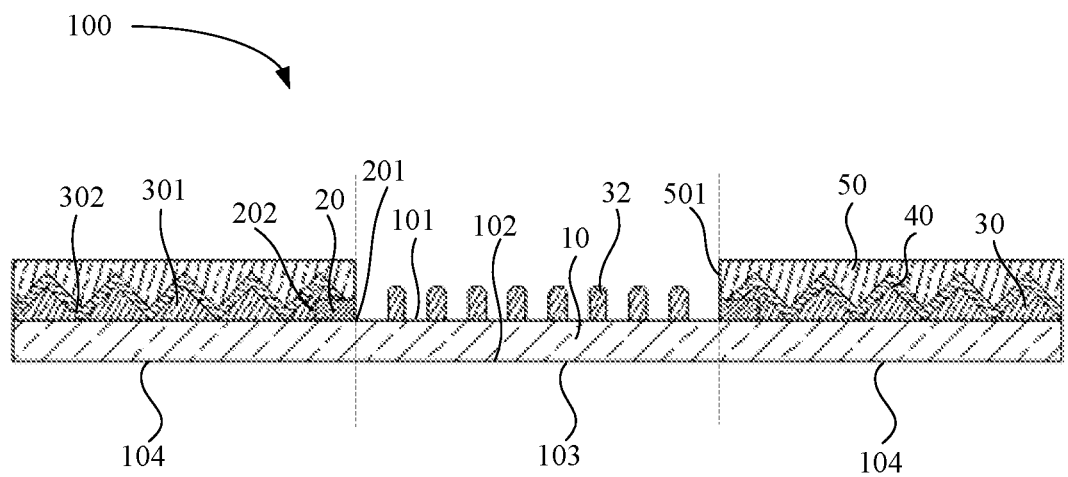
FIG. 1 is a cross-sectional view of a cover glass lamination structure according to one embodiment.

Referring to FIG. 1, a cover glass lamination structure 100 can serve as a displaying housing for electronic devices (not shown) with touch function, the electronic devices can include, but are not limited to, mobile phones, cameras, tablets, and terminal displays.

The cover glass lamination structure 100 includes a glass substrate 10, a boarder layer 20, an ultraviolet (UV) textured layer 30, a UV moth-eye structure 32, a coating layer 40, and a base cover ink layer 50.

Figure 2:
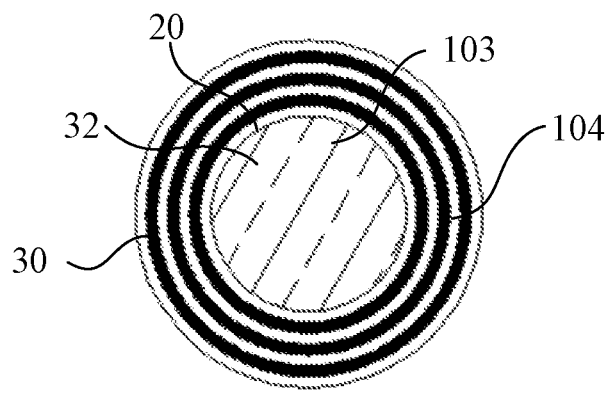
FIG. 2 is a top plan view of the cover glass lamination structure of FIG. 1.

The glass substrate 10 has a first surface 101 and a second surface 102, which are opposite to each other. In the illustrated embodiment, the glass substrate 10 is a flat glass. In alternative embodiments, the glass substrate 10 may have at least part of a curved surface. The glass substrate 10 can be shaped as a rectangle, a circle, a square or the like, depending on what electronic device to be applied. As illustrated in FIG. 2, the glass substrate 10 has a circular shape.

In the illustrated embodiment, the first surface 101 of the glass substrate 10 faces an interior of the electronic device, while the second surface 102 faces the user. The glass substrate 10 has a visible region 103 in a middle portion thereof and a peripheral region 104 located at an edge portion thereof. The boarder layer 20 is disposed on the first surface 101. The visible region 103 and the peripheral region 104 are defined according to the boarder layer 20. For example, an inner edge 201 of the border layer 20 can be regarded as a boundary line, and a region surrounded by the inner edge 201 is defined as the visible region 103. In alternative embodiments, in a case where the glass substrate 10 has a polygonal shape such as a rectangle, the boarder layer 20 may be disposed on partial side of the glass substrate 10 and does not have to form a closed loop structure. An outer edge 202 of the boarder layer 20 is within an edge of the glass substrate 10, i.e., the border layer 20 is located within the peripheral region 104. The boarder layer 20 can serve as an alignment reference for processing subsequent layers, such as the UV textured layer 30, the UV moth-eye structure 32, and the coating layer 40, thus a higher machining precision can be obtained. The boarder layer 20 itself can also serve as a decorative layer with a decorative effect, such that the division of the peripheral region 104 and the visible region 103 will become more distinct and bright. In one embodiment, the boarder layer 20 can be a printed ink layer. In alternative embodiments, the boarder layer 20 may also be made of other materials that can be attached to the glass substrate 10, and the formation of the boarder layer 20 is not limited to printing (e.g., plating).

It should be understood that, in alternative embodiments, the boarder layer 20 can be omitted, and in that case, the UV textured layer 30 is formed directly on the first surface 101.

The UV textured layer 30 is disposed on the first surface 101 and within the peripheral region 104. An outer edge of the UV textured layer 30 is coplanar with the edge of the glass substrate 10. An inner edge of the UV textured layer 30 falls within the range of the boarder layer 20, or the inner edge of the UV textured layer 30 can be coplanar with the inner edge 201 of the boarder layer 20. By employing different templates, the UV textured layer 30 with different patterns can be presented, thereby the appearance of the cover glass lamination structure 100 will become more attractive and personalized.

In one embodiment, the UV textured layer 30 is provided with a plurality of protrusions 301, and a recess 302 is formed between two adjacent protrusions 301. Therefore, the pattern of the UV textured layer 30 is presented by tracks formed by the protrusions 301 and the recesses 302. The pattern formed by extending the protrusions 301 and the recesses 302 is shaped as a concentric circular (see FIG. 2), wavy, crossed grid or wire drawing pattern.

Figure 3:
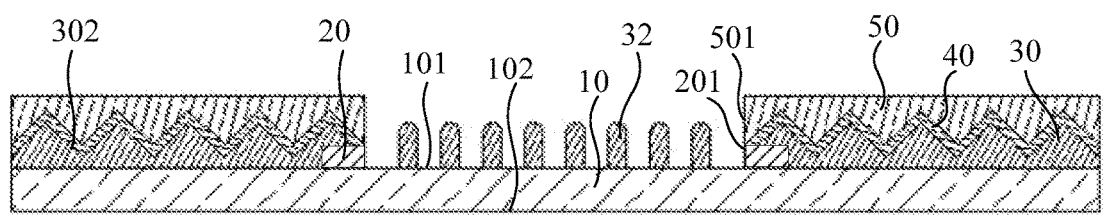
FIG. 3 is a cross-sectional view of a cover glass lamination structure according to another embodiment.

As illustrated in FIG. 1, a bottom of the recess 302 is located on the first surface 101. In an alternative embodiment, referring to FIG. 3, a bottom of the recess 302 is spaced apart from the first surface 101. By different configuration of the bottom of the recess 302, different visual effect can be achieved.

The protrusion 301 has a height of about 5 µm to about 200 µm, and a width of about 20 µm to about 200 µm. It has been verified that, with the foregoing dimensions, in combination with the coating layer 40, the UV textured layer 30 can exhibit a wonderful visual effect and a significant attraction. Meanwhile, the protrusion 301 having the above-mentioned height exhibits a greater advantage in the manufacturing process, for example, it is much easier to be attached and formed on the glass substrate 10. In one embodiment, the protrusion 301 has a height of about 10 µm to about 100 µm, and a width of about 50 µm to about 100 µm.

Figure 4:
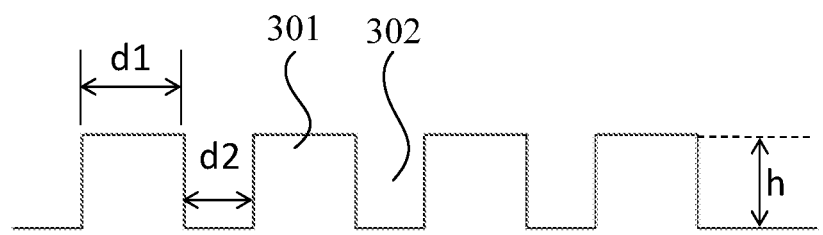
FIG. 4 is a schematic view of a UV textured layer according to one embodiment.

In one embodiment, as shown in FIG. 4, the protrusion 301 has a columnar cross-section, and a distance d2 between two adjacent protrusions 301 (i.e. the width of the recess 302) is about 5 µm to about 100 µm. Furthermore, two adjacent protrusions 301 are spaced at about 10 µm to about 50 µm. Referring to FIG. 4, the height and width of the protrusion 301 are represented by h and d1, respectively. The height h is referred as a distance from a bottom of the recess 302 to a top of the protrusion 301.

Figure 5:
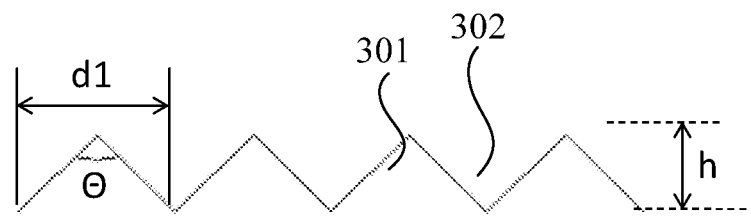
FIG. 5 is a schematic view of a UV textured layer according to another embodiment.
Figure 6:
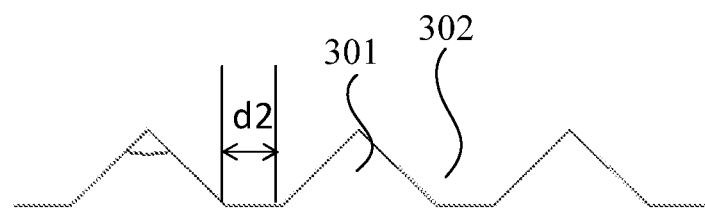
FIG. 6 is a schematic view of a UV textured layer according to another embodiment.

In one embodiment, as shown in FIG. 5, a cross-section of the protrusion 301 is shaped as a triangle. The height and width of the protrusion 301 are represented by h and d1, respectively. The height h is referred as a distance from a bottom of the recess 302 to a top of the protrusion 301. As shown in FIG. 5, bottoms of two adjacent protrusions 301 are abutted. In alternative embodiments, as shown in FIG. 6, bottoms of two adjacent protrusions 301 are spaced apart from each other, e.g., a distance d2 between two bottoms of the two adjacent protrusions 301 (i.e., the width of the bottom of the recess 302) is about 5 µm to about 100 µm. Additionally, a distance d2 between two bottoms of the two adjacent protrusions 301 can be about 10 µm to about 50 µm. An angle θ of an apex of the triangle is about 30° to about 150°. In one embodiment, the angle θ can be about 45° to about 120°.

Figure 7:
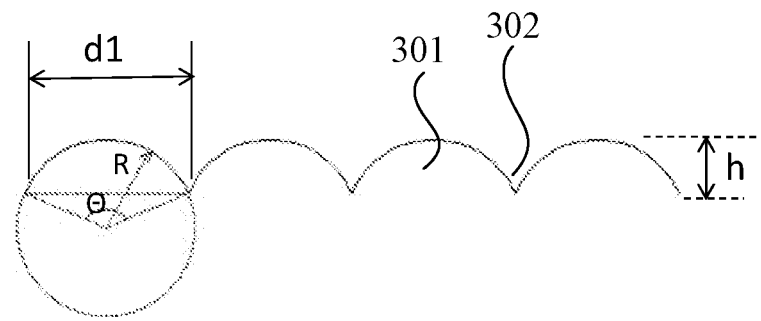
FIG. 7 is a schematic view of a UV textured layer according to another embodiment.
Figure 8:
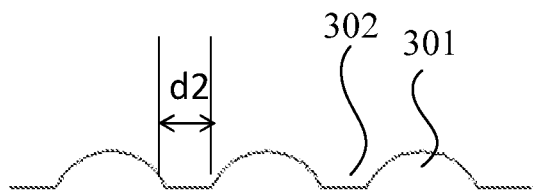
FIG. 8 is a schematic view of a UV textured layer according to another embodiment.

In one embodiment, as shown in FIG. 7, a cross-section of the protrusion 301 is shaped as an arc. The height and width of the protrusion 301 are represented by h and d1, respectively. The height h of the protrusion 301 is a height of the arc, the width d1 of the protrusion 301 is a length of the chord corresponding to the arc. In the illustrated embodiment shown in FIG. 5, the cross-section of the protrusion 301 is shaped as a minor arc, i.e., the height h of the protrusion 301 is less than a radius R of a circle corresponding to the arc.

As shown in FIG. 7, bottoms of two adjacent protrusions 301 are abutted. In alternative embodiments, as shown in FIG. 6, bottoms of two adjacent protrusions 301 are spaced apart from each other, e.g., a distance d2 between two bottoms of the two adjacent protrusions 301 (i.e. the width of the bottom of the recess 302) is about 5 µm to about 100 µm. Additionally, a distance d2 between two bottoms of the two adjacent protrusions 301 can be about 10 µm to about 50 µm. A central angle θ of the arc is about 30° to about 150°. In one embodiment, the central angle θ is about 45° to about 120°.

After the coating layer 40 is disposed on the UV textured layer 30, since the coating layer 40 is non-transparent, the region where the UV textured layer 30 is located, i.e., the peripheral region 104, will be shielded by the coating layer 40. Since the UV textured layer 30 is transparent, the pattern presented by the UV textured layer 30 and the coating layer 40 is still can be observed from the second surface 102 side.

The UV moth-eye structure 32 is made of the same material as that of the UV textured layer 30. For example, the UV moth-eye structure 32 and the UV textured layer 30 can be formed by simultaneously imprinting a UV adhesive using a particular template. In other words, the UV moth-eye structure 32 and the UV textured layer 30 are formed directly on the first surface 101. When the first surface 101 is a flat surface, the UV moth-eye structure 32 and the UV textured layer 30 are located on the same plane. The UV moth-eye structure 32 has a structure similar to moths' eyes, a surface of which is covered with a natural nanostructured film, the nanostructure consists of a hexagonal pattern of bumps, each roughly 200 nm high and spaced on 300 nm centers. The UV moth-eye structure 32 has a moth-eye effect on the passing light. The so-called "moth-eye effect" refers to that, because the bumps are smaller than the wavelength of visible light, the light sees the surface as having a continuous refractive index gradient between the air and the medium, which decreases reflection by effectively removing the air-lens interface. Therefore, the moth-eye structure 32 can eliminate reflection. When the cover glass lamination structure 100 employing such structure is applied to the electronic devices, the resolution of the electronic devices can be greatly improved, and the content on the screen can still be displayed properly in bright light, thus facilitating user to read. In addition, since the UV moth-eye structure 32 and the UV textured layer 30 can be formed in the same process, there is no need to additionally coat an anti-reflection structure on the glass substrate 10, thus reducing the processing steps and number of layers, and simplifying the structure.

Referring to FIG. 1 again, the coating layer 40 is disposed on the UV textured layer 30. The coating layer 40 may be, for example, a film exhibiting a metallic color. The coating layer 40 can be filled in the recess 302 or attached to the surface of the protrusion 301 of the UV textured layer 30. By the aid of the pattern of the UV textured layer 30, an appearance with different patterns and colors can be observed from a side of the second surface 102 of the glass substrate 10. The coating layer 40 may be one layer or more than one layers.

An inner edge of the coating layer 40 is coplanar with the inner edge of the UV textured layer 30. In other words, the region where the coating layer 40 is located is the peripheral region 104, and the region where the UV moth-eye structure 32 is located is the visible region 103. The visible region 103 is a visually visible region, which is transparent in a visible direction from the second surface 102 towards the first surface 101. The peripheral region 104 is non-transparent and invisible by virtue of the coating layer 40, i.e., one cannot see the scene on the other side of the glass substrate 10 in a visible direction from the second surface 102 towards the first surface 101.

The base cover ink layer 50 is disposed on the coating layer 40. Both of the base cover ink layer 50 and the coating layer 40 are not transparent, such that the portion of the glass substrate 10 shielded by the base cover ink layer 50 and the coating layer 40 will not be seen when observing from the second surface 102 side.

In one embodiment, outer edges of the base cover ink layer 50 and the coating layer 40 are coplanar with the edge of the glass substrate 10. Similarly, outer edges of the UV textured layer 30 and the coating layer 40 are coplanar with an outer edge of the base cover ink layer 50. In the illustrated embodiment shown in FIG. 3, an inner edge 501 of the base cover ink layer 50 is coplanar with the inner edge of the coating layer 40, i.e. the inner edge 501 of the base cover ink layer 50 is coplanar with the inner edge 201 of the boarder layer 20. In alternative embodiments, the inner edge 501 of the base cover ink layer 50 can fall within the range of the boarder layer 20. The base cover ink layer 50 may be one layer or more than one layers. It should be understood that, in alternative embodiments, the base cover ink layer 50 can be omitted.

Figure 9:
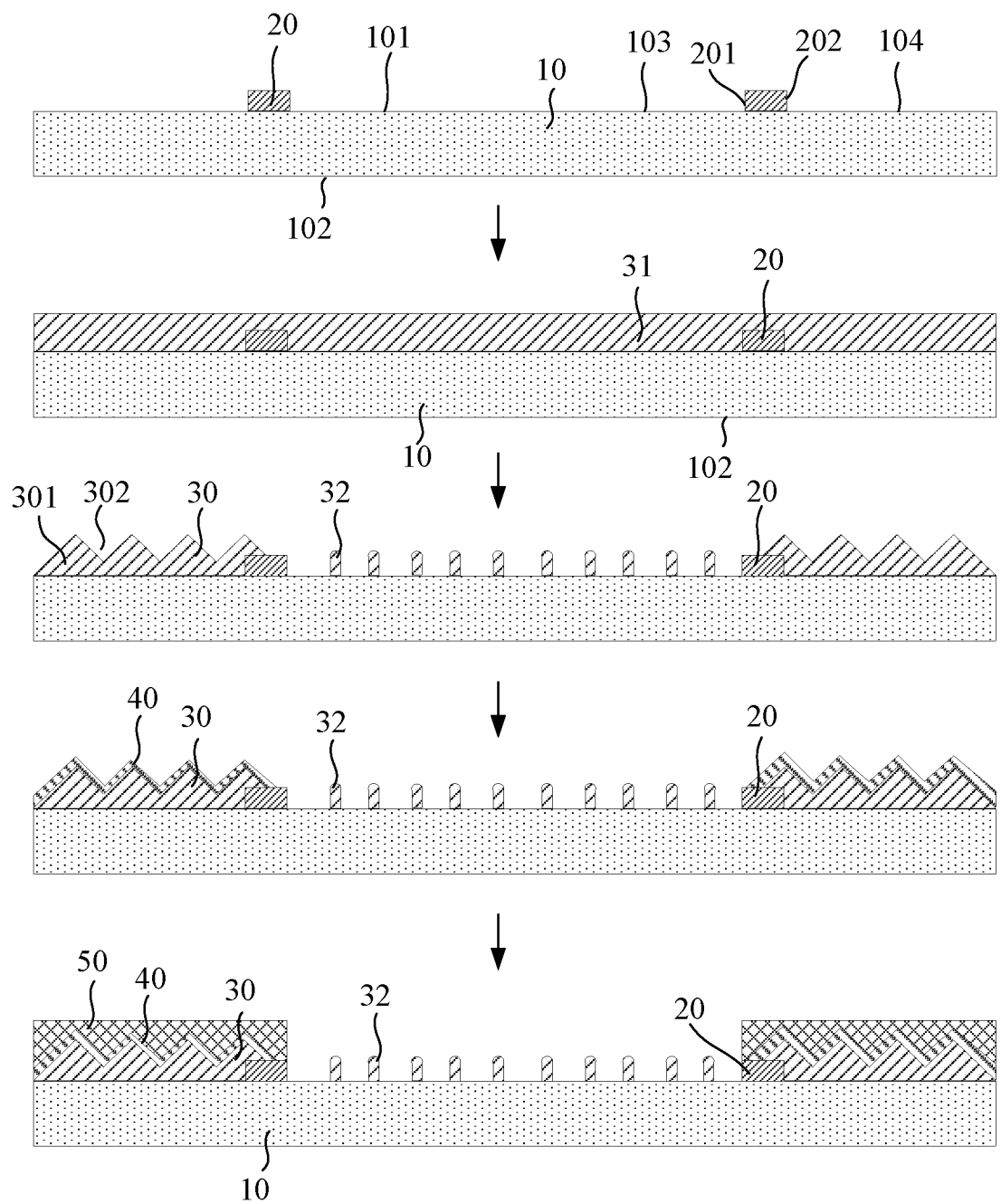
FIG. 9 illustrates diagrams representing various stages of a method of manufacturing the cover glass lamination structure according to one embodiment.

Referring to FIG. 9, a method of manufacturing the cover glass lamination structure 100 is also provided, which includes the following steps:

Firstly, a glass substrate 10 having opposed first and second surfaces 101, 102 is provided. The glass substrate 10 may be previously subjected to a cleaning step or the like.

Next, a boarder layer 20 is formed on the first surface 101. The glass substrate 10 is divided into a visible region 103 and a peripheral region 104 by an inner edge 201 of the boarder layer 20. The boarder layer 20 is partially located on the peripheral region 104. The boarder layer 20 can be a printed ink layer, or a linear film layer serving as positioning and/or ornamentation. In alternative embodiments, the boarder layer 20 can be omitted.

Next, a UV adhesive 31 is coated on the glass substrate 10. The UV adhesive 31 is coated on the entire first surface 101 and covers the boarder layer 20. The UV adhesive 31 has a thickness greater than that of the boarder layer 20. After a specific template is rolled on the UV adhesive 31, a UV textured layer 30 is formed in the peripheral region 104, and a UV moth-eye structure 32 is formed in the visible region 103. The UV textured layer 30 is provided with a plurality of protrusions 301, and a recess 302 is formed between two adjacent protrusions 301. A bottom of the recess 302 can be located to the first surface 101, or is spaced apart from the first surface 101.

In the case where the glass substrate 10 is rectangular, the boarder layer 20 can be a closed loop, or it can be provided on a part of the side of the glass substrate 10. Accordingly, the UV textured layer 30 can occupy the peripheral region of the glass substrate 10, or it may be located on the edge region of both sides. The size and the location of the UV moth-eye structure 32 can be determined according to a region where the antireflection effect and the antireflection effect are finally required. In one embodiment, the glass substrate 10 is rectangular, and the UV textured layer 30 is located on the edge region of the glass substrate 10 on both sides, the UV moth-eye structure 32 can be positioned between the UV textured layer 30 on both sides, while the UV textured layer 30 may be or not formed on the other two side edge regions where no UV textured layer 30 is formed.

Next, a coating layer 40 is formed on the UV textured layer 30. The coating layer 40 may be one layer or more than one layers.

Additionally, a base cover ink layer 50 is formed on the coating layer 40 by printing.

In one embodiment, during the formation of the coating layer 40, a film is plated on the first surface 101 covering the UV textured layer 30 and the UV moth-eye structure 32. The base cover ink layer 50 is then printed on the film. After the base cover ink layer 50 is formed, the film is subjected to a plating stripping treatment using the base cover ink layer 50 as a mask, thus forming the coating layer 40.

In alternative embodiments, during the formation of the coating layer 40, a protection film can be formed on the visible region 103 where no UV textured layer 30 is located. A film is then plated on the UV textured layer 30 and the protection film. After that, the protection film is peeled off, thus forming the coating layer 40. It should be understood that, the protective film may be a peelable adhesive film or the like.

Although the description is illustrated and described herein with reference to certain embodiments, the description is not intended to be limited to the details shown. Modifications may be made in the details within the scope and range equivalents of the claims.

What is claimed is:
1. A cover glass lamination structure, comprising:
   a glass substrate having opposed first and second surfaces, wherein the glass substrate has a visible region in a middle portion thereof and a peripheral region located at a peripheral of the visible region;
   an ultraviolet (UV) textured layer disposed on the first surface and within the peripheral region, wherein the UV textured layer comprises a plurality of protrusions, the protrusion has a height of about 5 μm to about 200 μm, and a width of about 20 μm to about 200 μm; and
   a coating layer disposed on the UV textured layer.

2. The cover glass lamination structure according to claim 1, wherein the protrusion has a height of about 10 μm to about 100 μm, and a width of about 50 μm to about 100 μm.

3. The cover glass lamination structure according to claim 1, wherein a cross-section of the protrusion is shaped as a column, bottoms of two adjacent protrusions are abutted, or bottoms of two adjacent protrusions are spaced at about 5 μm to about 100 μm.

4. The cover glass lamination structure according to claim 3, wherein bottoms of two adjacent protrusions are spaced at about 10 μm to about 50 μm.

5. The cover glass lamination structure according to claim 1, wherein a cross-section of the protrusion is shaped as a triangle or an arc, bottoms of two adjacent protrusions are abutted, or bottoms of two adjacent protrusions are spaced at about 5 μm to about 100 μm.

6. The cover glass lamination structure according to claim 5, wherein bottoms of two adjacent protrusions are spaced at about 10 μm to about 50 μm.

7. The cover glass lamination structure according to claim 5, wherein an angle of an apex of the triangle is about 30° to about 150°; or a central angle of the arc is about 30° to about 150°.

8. The cover glass lamination structure according to claim 7, wherein an angle of an apex of the triangle is about 45° to about 120°; or a central angle of the arc is about 45° to about 120°.

9. The cover glass lamination structure according to claim 1, wherein a recess is formed between two adjacent protrusions, a pattern formed by extending the protrusion and the recess is shaped as a concentric circular, wavy, crossed grid or wire drawing pattern.

10. The cover glass lamination structure according to claim 1, wherein a recess is formed between two adjacent protrusions, a bottom of the recess is located on the first surface, or a bottom of the recess is spaced apart from the first surface.

11. The cover glass lamination structure according to claim 1, further comprising a border layer disposed on the first surface, wherein the glass substrate is divided into the visible region and the peripheral region by an inner edge of the border layer.

12. The cover glass lamination structure according to claim 1, further comprising a UV moth-eye structure disposed on the first surface and within the visible region.

13. The cover glass lamination structure according to claim 1, further comprising a base cover ink layer disposed on the coating layer.

* * * * *